US010642631B1

(12) United States Patent
Gupta et al.

(10) Patent No.: US 10,642,631 B1
(45) Date of Patent: May 5, 2020

(54) APPARATUS, SYSTEM, AND METHOD FOR DYNAMICALLY REPLACING CALL PATHS OF RUNNING APPLICATIONS

(71) Applicant: Juniper Networks, Inc., Sunnyvale, CA (US)

(72) Inventors: Aayush Gupta, Delhi (IN); Ramkrishna Sharma, Bangalore (IN)

(73) Assignee: Juniper Networks, Inc, Sunnyvale, CA (US)

( * ) Notice: Subject to any disclaimer, the term of this patent is extended or adjusted under 35 U.S.C. 154(b) by 91 days.

(21) Appl. No.: 15/964,100

(22) Filed: Apr. 27, 2018

(51) Int. Cl.
*G06F 9/445* (2018.01)
*G06F 9/54* (2006.01)

(52) U.S. Cl.
CPC .......... *G06F 9/44521* (2013.01); *G06F 9/54* (2013.01)

(58) Field of Classification Search
None
See application file for complete search history.

(56) References Cited

U.S. PATENT DOCUMENTS

2003/0084229 A1* 5/2003 Ho
2008/0301682 A1* 12/2008 Newport

OTHER PUBLICATIONS

Call Stack; https://en.wikipedia.org/wiki/Call_stack (Dec. 15, 2005).
JSON; https://en.wikipedia.org/wiki/JSON (May 7, 2005).
Library (computing); https://en.wikipedia.org/wiki/Library_(computing) (Nov. 7, 2004).

* cited by examiner

*Primary Examiner* — Syed A Roni
(74) *Attorney, Agent, or Firm* — FisherBroyles, LLP

(57) ABSTRACT

The disclosed computer-implemented method may include (1) generating a replacement application program interface (API) to be implemented during execution of an application in lieu of at least one instance of a target API of the application, (2) extracting, from a call stack of the application, a return address of the instance of the target API, (3) detecting, during execution of the application, a call to the target API that pushes the return address of the instance of the target API onto the call stack of the application, and then in response to detecting the call (4) implementing the replacement API in lieu of the target API. Various other apparatuses, systems, and methods are also disclosed.

20 Claims, 9 Drawing Sheets

APPARATUS, SYSTEM, AND METHOD FOR DYNAMICALLY REPLACING CALL PATHS OF RUNNING APPLICATIONS

BACKGROUND

Software developers may wish to assess the performance or behavior of an application during various potential runtime scenarios. For example, a software developer may simulate or generate an error during execution of an application. The developer may then update or re-program the application such that the application is capable of appropriately preventing and/or correcting consequences of the error. A developer may also analyze the behavior of an application during additional types of execution scenarios, including those involving certain interactions with users or other applications.

To determine the behavior of an application during a certain execution scenario, a software developer may replace a function that the application is programmed to call with a different function. As an example, a developer may recreate a particular error scenario within an application by replacing a call path to an application program interface (API) the application is programmed to follow with a call path to a different (e.g., malfunctioning) API. Traditionally, replacing a call path of an application may involve manual adjustments to the source code of the application. For example, a software developer may test an execution scenario involving a particular call path by directly programming the application to follow the call path. Unfortunately, this traditional method for replacing call paths of applications may burden software developers with slow and/or tedious manual testing. Moreover, manually altering the source code of an application may increase the chance of introducing errors or bugs to the code.

The instant disclosure, therefore, identifies and addresses a need for improved apparatuses, systems, and methods for dynamically replacing call paths of running applications.

SUMMARY

As will be described in greater detail below, the instant disclosure generally relates to apparatuses, systems, and methods for dynamically replacing call paths of running applications In one example, a computer-implemented method for performing this task may include (1) generating a replacement API to be implemented during execution of an application in lieu of at least one instance of a target API of the application, (2) extracting, from a call stack of the application, a return address of the instance of the target API, (3) detecting, during execution of the application, a call to the target API that pushes the return address of the instance of the target API onto the call stack of the application, and then in response to detecting the call (4) implementing the replacement API in lieu of the target API.

As another example, a system for implementing the above-described method may include various modules stored in memory. The system may also include at least one hardware processor that executes these modules. For example, the system may include (1) a generation module that generates a replacement API to be implemented during execution of an application in lieu of at least one instance of a target API of the application, (2) an extraction module that extracts, from a call stack of the application, a return address of the instance of the target API, (3) a detection module that detects, during execution of the application, a call to the target API that pushes the return address of the instance of the target API onto the call stack of the application, and (4) an implementation module that implements, in response to detecting the call, the replacement API in lieu of the target API.

As a further example, an apparatus for implementing the above-described method may include at least one storage device that stores computer-executable instructions executed by an application. The apparatus may also include at least one physical processing device communicatively coupled to the storage device, wherein the physical processing device (1) generates a replacement API to be implemented during execution of the application in lieu of at least one instance of a target API of the application, (2) extracts, from a call stack of the application, a return address of the instance of the target API, (3) detects, during execution of the application, a call to the target API that pushes the return address of the instance of the target API onto the call stack of the application, and then in response to detecting the call (4) implements the replacement API in lieu of the target API.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
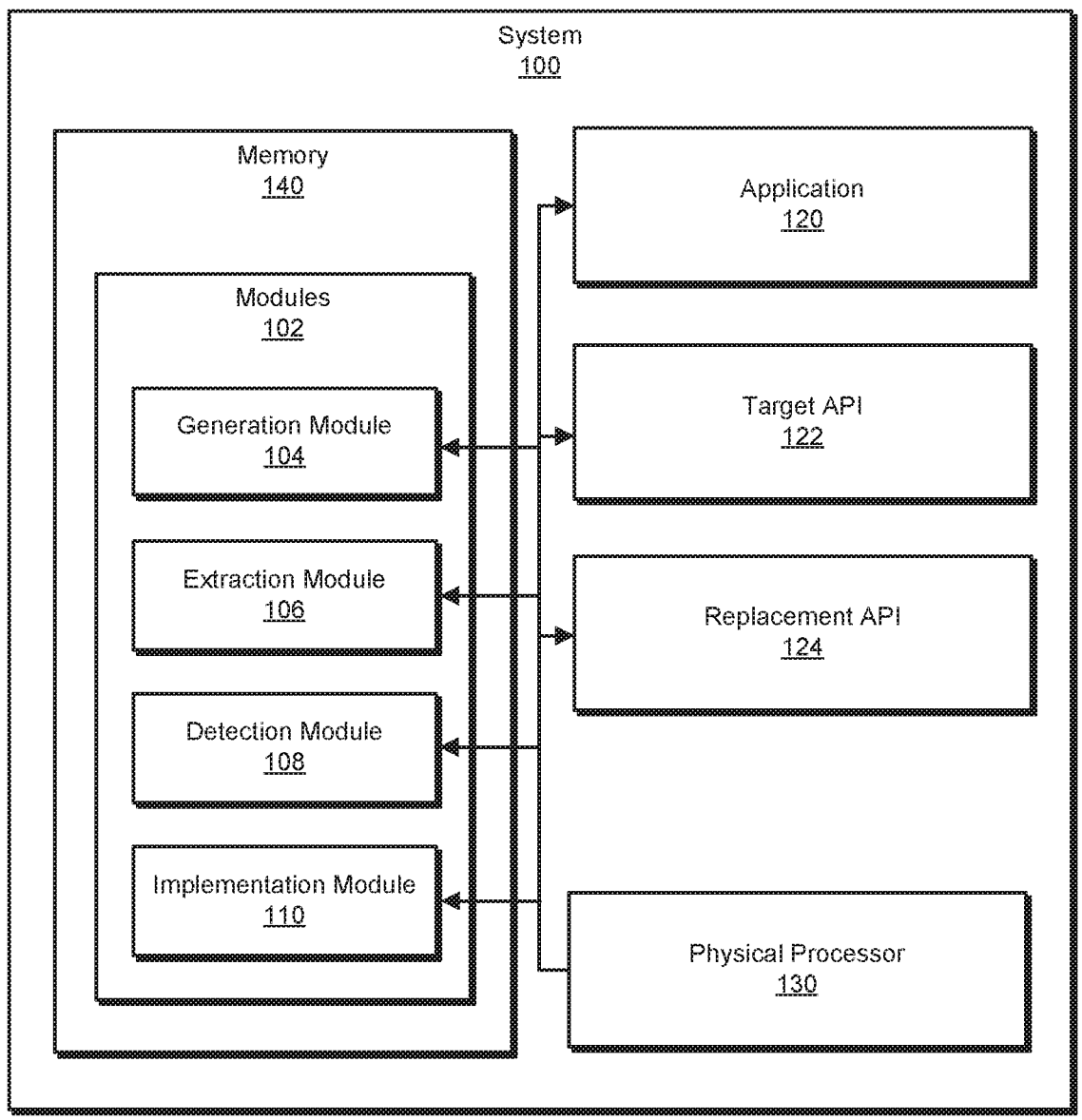
FIG. 1 is a block diagram of an exemplary system for dynamically replacing call paths of running applications

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for dynamically replacing call paths of running applications. As will be explained in greater detail below, embodiments of the instant disclosure may replace a call to an API with a call to a different API during execution of an application. For example, the disclosed apparatuses, systems, and methods may monitor each call to an API that an application makes while running. In response to detecting a particular call that has been previously selected (e.g., by a user) to be replaced with a call to another API, these apparatuses, systems, and methods may change and/or redirect the original call path to a different call path that leads to the other API. In contrast to traditional systems for replacing and/or testing certain call paths, the disclosed apparatuses, systems, and methods may dynamically replace a call path of an application without altering source code of the application.

Embodiments of the instant disclosure may enable software developers to efficiently test and/or analyze the performance of an application during various execution scenarios. For example, by dynamically replacing certain call paths of an application, the disclosed apparatuses, systems, and methods may model and/or simulate potential errors and/or other unexpected situations that may occur within the application. Furthermore, some embodiments of the instant disclosure may automatically create a replacement API based on input from a user. For example, the disclosed apparatuses, systems, and methods may generate a set of computer-executable instructions that perform desired functions of the replacement API, thereby reducing and/or eliminating the need for the user to manually program the replacement API. In addition, by replacing call paths of an application without altering the source code of the application, these apparatuses, systems, and methods may help prevent errors from being introduced into the source code during testing.

The following will provide, with reference to FIGS. 1, 2, 7, and 8, detailed descriptions of exemplary systems and/or corresponding implementations for dynamically replacing call paths of running applications. Detailed descriptions of corresponding computer-implemented methods will be provided in connection with FIG. 3. In addition, detailed descriptions of exemplary input provided by users to facilitate dynamically replacing call paths of running applications will be provided in connection with FIG. 4. Detailed descriptions of exemplary assembly code of applications will be provided in connection with FIG. 5. Furthermore, detailed descriptions of exemplary replacement scenario tables used to dynamically replace call paths of running applications will be provided in connection with FIG. 6. Finally, detailed descriptions of an exemplary computing system for carrying out these methods and/or implementations will be provided in connection with FIG. 9.

FIG. 1 is a block diagram of an exemplary system 100 for automatically replacing call paths of running applications. As illustrated in this figure, exemplary system 100 may include one or more modules 102 for performing one or more tasks. As will be explained in greater detail below, modules 102 may include a generation module 104, an extraction module 106, a detection module 108, and an implementation module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as computing device 202 illustrated in FIG. 2. In addition, one or more of modules 102 may perform any of the functionality described herein in connection with any of the devices, applications, and/or units illustrated in FIG. 2. One or more of modules 102 in FIG. 1 may also represent all or portions of one or more special-purpose computers configured to perform one or more tasks.

As illustrated in FIG. 1, system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, system 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate dynamically replacing call paths of running applications. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may also include one or more applications, such as an application 120. Application 120 generally represents any type or form of program, portion of software, and/or set of computer-executable instructions that may be hosted on and/or executed by a computing device. In one embodiment, application 120 may represent an application that is currently being developed and/or tested. For example, application 120 may represent an application that a software developer is attempting to create, instrument, improve, test, and/or update. As will be explained in greater detail below, the disclosed systems may enable a software developer to test the performance and/or functionality of application 120 by implementing various call paths and/or APIs within application 120 without changing the source code of application 120.

As illustrated in FIG. 1, exemplary system may also include one or more APIs, such as a target API 122 and a replacement API 124. The term "API," as used herein, generally refers to any subroutine, function, protocol, and/or tool that facilitates communication between two or more software components. In some examples, an application may call and/or implement one or more APIs while running in order to access and/or connect with various libraries, additional applications, databases, functions, etc.

The term "target API," as used herein, generally refers to any API that an application is programmed to call and/or implement. In one example, a target API may represent an API that a user has selected to dynamically replace with a replacement API during execution of an application. The term "replacement API," as used herein, generally refers to any API that the disclosed systems call and/or implement in lieu (e.g., instead) of one or more instances of a target API. In some examples, a replacement API may perform one or more different functions and/or exhibit one or more different properties than a target API.

The term "instance of an API," as used herein, generally refers to and/or represents a single call made to a particular API during execution of an application. In some examples, application 120 may be programmed to call multiple instances of target API 122. As will be explained in greater detail below, the disclosed systems may enable a developer of application 120 to replace all or a portion of these instances of target API 122 with replacement API 124.

Figure 2:
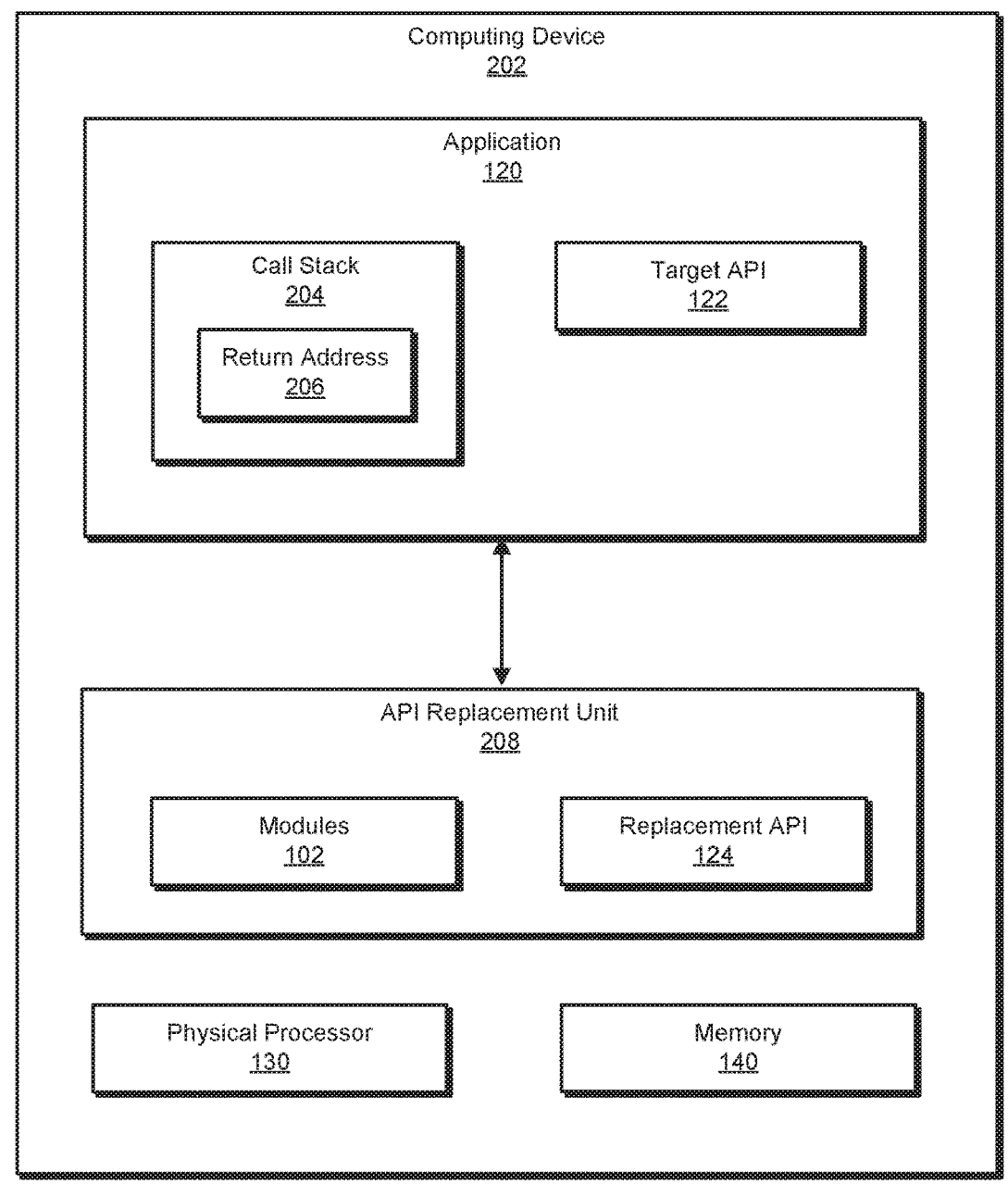
FIG. 2 is a block diagram of an additional exemplary system for dynamically replacing call paths of running applications

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202. In one example, all or a portion of the functionality of modules 102 may be performed by computing device 202 and/or any additional computing device not illustrated in FIG. 2 (such as a backend server or database). As will be described in greater detail below, one or more of modules 102 from FIG. 1 may, when executed by at least one processor of computing device 202, enable computing device 202 to dynamically replace call paths of applications running on computing device 202.

Computing device 202 generally represents any type or form of physical computing device capable of reading computer-executable instructions. In one example, computing device 202 may include and/or represent a computing device designed to and/or capable of testing, using, and/or developing application 120. In this example, computing device 202 may run a program and/or tool that is designed to facilitate testing application 120 by dynamically replacing call paths of application 120. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, routers (such as provider edge routers, hub routers, spoke routers, autonomous system boundary routers, and/or area border routers), switches, hubs, modems, bridges, repeaters, gateways, multiplexers, network adapters, network interfaces, variations or combinations of one or more of the same, and/or any other suitable computing devices.

In the example of FIG. 2, application 120 may generate and/or utilize a call stack 204 while running on computing device 202. As will be explained in greater detail below, call stack 204 may contain and/or indicate a return address 206. In some embodiments, return address 206 may represent the return address of an instance of target API 122 that is to be replaced with replacement API 124.

In the example of FIG. 2, computing device 202 may host and/or run an API replacement unit 208. API replacement unit 208 generally represents any type or form of program, application, and/or tool that facilitates dynamically replacing call paths of application 120. As illustrated in FIG. 2, API replacement unit 208 may host and/or run one or more of modules 102. In one embodiment, API replacement unit 208 may monitor and/or interact with application 120 before and/or during execution of application 120. Additionally or alternatively, API replacement unit 208 may be part of and/or operated by application 120.

Figure 3:
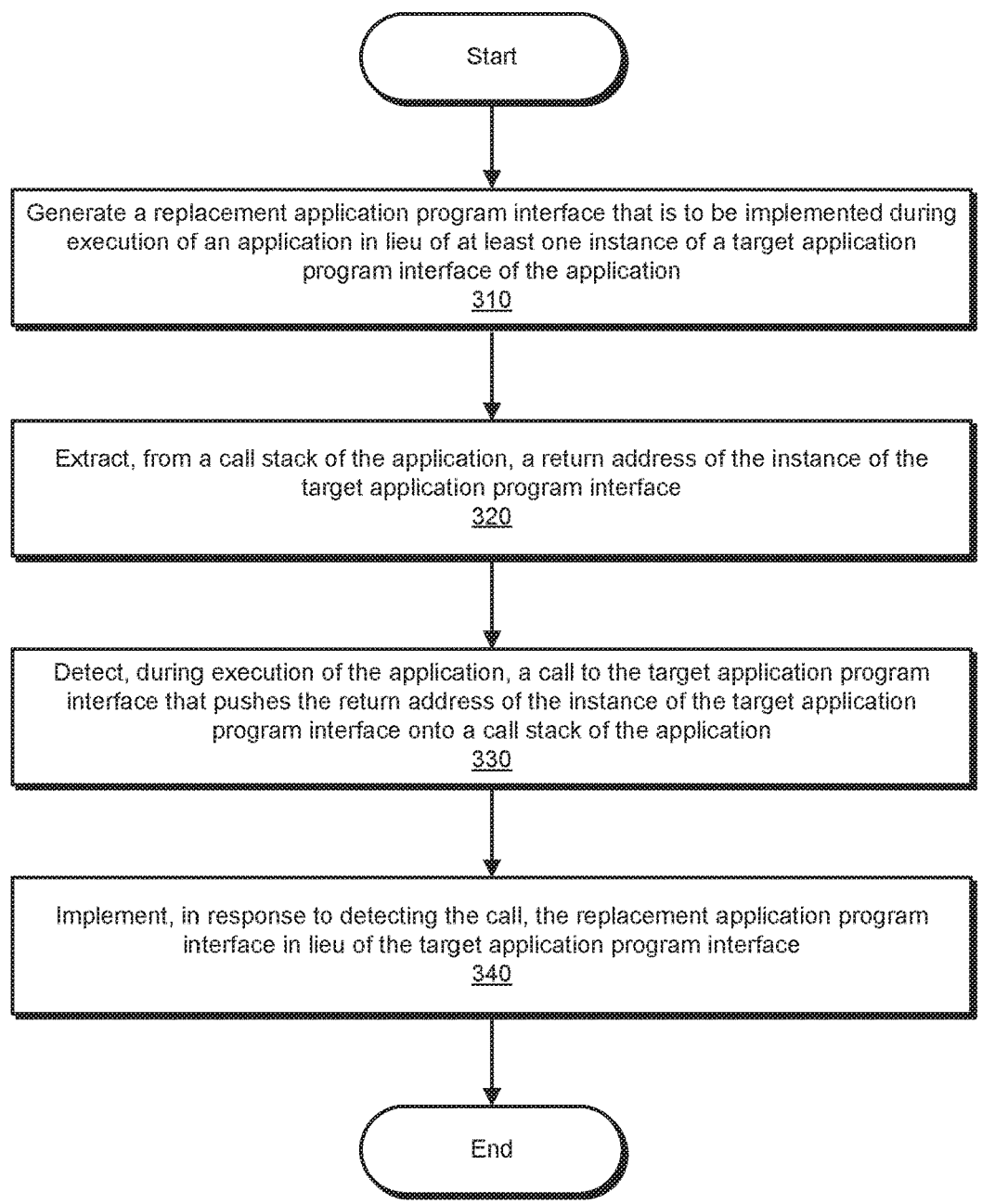
FIG. 3 is a flow diagram of an exemplary method for dynamically replacing call paths of running applications

FIG. 3 is a flow diagram of an example computer-implemented method 300 for dynamically replacing call paths of running applications. The steps shown in FIG. 3 may be performed by any suitable computer-executable code and/or computing system, including system 100 in FIG. 1, system 200 in FIG. 2, implementation 700 in FIG. 7, implementation 800 in FIG. 8, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may generate a replacement API to be implemented during execution of an application in lieu of at least one instance of a target API of the application. For example, generation module 104 may, as part of computing device 202 in FIG. 2, generate replacement API 124 to implemented in lieu of at least one instance of target API 122 during execution of application 120.

The systems described herein may perform step 310 in a variety of ways and/or contexts. In some examples, generation module 104 may receive input from a user of application 120 that indicates one or more instances of target API 122 that the user wishes to be replaced during execution of application 120. In addition, generation module 104 may receive input from the user that indicates one or more desired and/or expected functions of replacement API 124. Based on this user input, generation module 104 may generate, configure, and/or program replacement API 124 such that replacement API 124 is capable of performing the desired and/or expected functions.

In one embodiment, the user may indicate that each instance of target API 122 is to be replaced. In other words, the user may request a global or complete replacement of target API 122 with replacement API 124. In other embodiments, the user may indicate that only certain instances of target API 122 are to be replaced. For example, the user may identify particular computer-executable instructions executed by application 120 that contain calls to target API 122 that the user wishes to be replaced with calls to replacement API 124. Additionally or alternatively, the user may identify a caller function that calls one or more instances of target API 122 to be replaced. In another example, the user may indicate that a particular iteration of target API 122 within a loop is to be replaced. For example, the user may request to implement replacement API 124 in lieu of the second iteration of target API 122 within a loop that performs multiple iterations of target API 122. In this example, generation module 104 may determine that the remaining iterations of target API 122 within the loop are not to be replaced.

A user of application 120 may indicate various types of functions and/or properties that replacement API 124 is to provide and/or exhibit. For example, the user may input, to generation module 104, an application that replacement API 124 is to access and/or data that replacement API 124 is to handle. Additionally or alternatively, the user may indicate that replacement API 124 is to simulate and/or create a certain execution scenario for application 120. For example, the user may indicate that replacement API 124 is to simulate an error or other undesirable and/or unexpected behavior. In another example, the user may indicate that replacement API 124 is to facilitate instrumentation (e.g., testing and/or monitoring) of target API 122. For example, the user may request that replacement API 124 calls target API 122 and/or performs the same functions as target API 122. In this example, the user may also indicate that replacement API 124 is to monitor specific behaviors and/or outputs of target API 122 while target API 122 runs.

Generation module 104 may receive input from the user of application 120 in a variety of ways. In some examples, generation module 104 may receive a file from the user that outlines and/or defines desired functions of replacement API 124. In one embodiment, this file may represent and/or include a JavaScript Object Notation (JSON) file or similar type of file. After receiving such a file, generation module 104 may create, configure, and/or program replacement API 124 based on the information provided in the file. For example, generation module 104 may run a script that automatically extracts the desired functions of replacement API 124 from the file and then generates computer-executable instructions that perform the desired functions. In this way, generation module 104 may reduce and/or eliminate the need for the user to manually program replacement API 124 (as may be required by traditional systems for replacing call paths of running applications).

Figure 4:
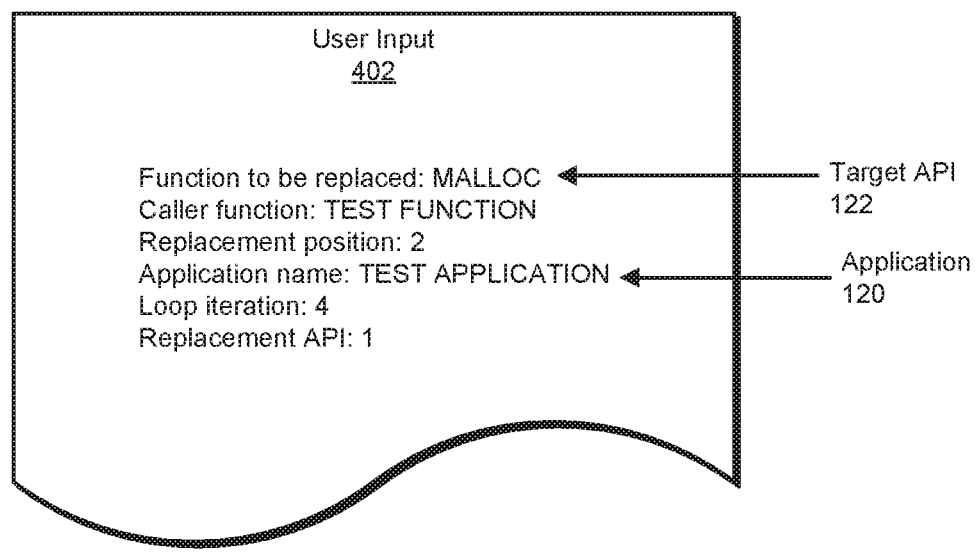
FIG. 4 is an illustration of exemplary input provided by a user to facilitate dynamically replacing call paths of running applications.

FIG. 4 illustrates exemplary user input 402 that a user of application 120 may provide to generation module 104. In this example, generation module 104 may determine that user input 402 identifies and/or describes one instance of target API 122 to be replaced. For example, generation module 104 may determine, based on user input 402, that the name of application 120 is "test application." Generation module 104 may also determine that target API 122 represents and/or calls the function "malloc" (a memory allocation command). Furthermore, generation module 104 may determine that the user wishes to replace an instance of target API 122 that is called by a caller function named "test function." Specifically, generation module 104 may determine, based on the replacement position "2" within user input 402, that the instance to be replaced is the second instance of target API 122 called by the caller function. In the example of FIG. 4, this instance of target API 122 may correspond to and/or represent a loop that performs multiple iterations of target API 122. As shown in FIG. 4, user input 402 may indicate that the particular instance of target API 122 to be replaced is the fourth iteration of target API 122 within the loop.

As shown in FIG. 4, user input 402 may also indicate a "replacement API" number (in this example, replacement API number "1"). In some examples, a replacement API number may identify and/or refer to a particular replacement API that is to be implemented in lieu of an instance of a target API. For example, a user may wish to replace, during a single run of application 120, one instance of target API 122 with a particular replacement API and another instance of target API 122 (or any other target API) with a different replacement API. As such, the user may provide generation module 104 with the desired functionality of both replacement APIs. In addition, the user may label each replacement API with a different replacement API number to enable the disclosed systems to implement the correct replacement APIs during execution of application 120. In the example of FIG. 1, replacement API number "1" may correspond to replacement API 124. User input 402 may include any additional or alternative information that enables the disclosed systems to accurately and/or efficiently generate and/or implement replacement API 124.

In some embodiments, generation module 104 may store replacement API 124 within a shared library or similar data structure. The term "shared library," as used herein, generally refers to any file that stores data and/or computer-executable instructions that may be accessed and/or implemented by multiple applications running on a computing device. In one embodiment, generation module 104 may store a definition (e.g., computer-executable instructions) of replacement API 124 within a shared library that is separate and/or distinct from a library that stores a definition of target API 122. For example, generation module 104 may store the definition of replacement API 124 within a replacement shared library that stores definitions of various replacement APIs that are to be implemented during execution of application 120. In other examples, generation module 104 may store the definition of replacement API 124 and the definition of target API 122 within the same shared library.

Returning to FIG. 3, at step 320 one or more of the systems described herein may extract, from a call stack of the application, a return address of the instance of the target API. For example, extraction module 106 may, as part of computing device 202 in FIG. 2, extract return address 206 from call stack 204.

The term "call stack," as used herein, generally refers to any data structure that contains memory addresses of instructions used by an application to call various subroutines (e.g., functions and/or sets of computer-executable instructions). In some examples, while a subroutine of an application is running, the subroutine may push (e.g., add) the memory address of the next subroutine that is to be called onto the application's call stack. In this way, execution control may be passed to the appropriate subroutine after the active subroutine finishes running. In some embodiments, a memory address that is added to a call stack by a subroutine may be referred to as the return address of the subroutine. Each subroutine called by an application may have a different return address. As such, a return address may be uniquely associated with a particular instance of a subroutine called by an application.

The systems described herein may perform step 320 in a variety of ways and/or contexts. In some examples, extraction module 106 may obtain return address 206 by disassembling all or a portion of the computer-executable instructions of application 120. For example, extraction module 106 may identify return address 206 within assembly code of the caller function that calls the instance of target API 122 to be replaced. In some embodiments, the assembly code of a caller function may contain and/or indicate the memory addresses of subroutines called by the caller function. As such, the assembly code may contain and/or indicate each return address that will be pushed onto the call stack of application 120 as the caller function runs.

As discussed in connection with step 310, the caller function that calls the instance of target API 122 to be replaced may be identified based on input provided by the user of application 120. Extraction module 106 may access and/or generate the assembly code of this caller function in a variety of ways, such as by using a GNU Debugger (GDB) or a similar debugging program. Extraction module 106 may then identify return address 206 by identifying, within the assembly code, a call that corresponds to the call described by the user input.

Figure 5:
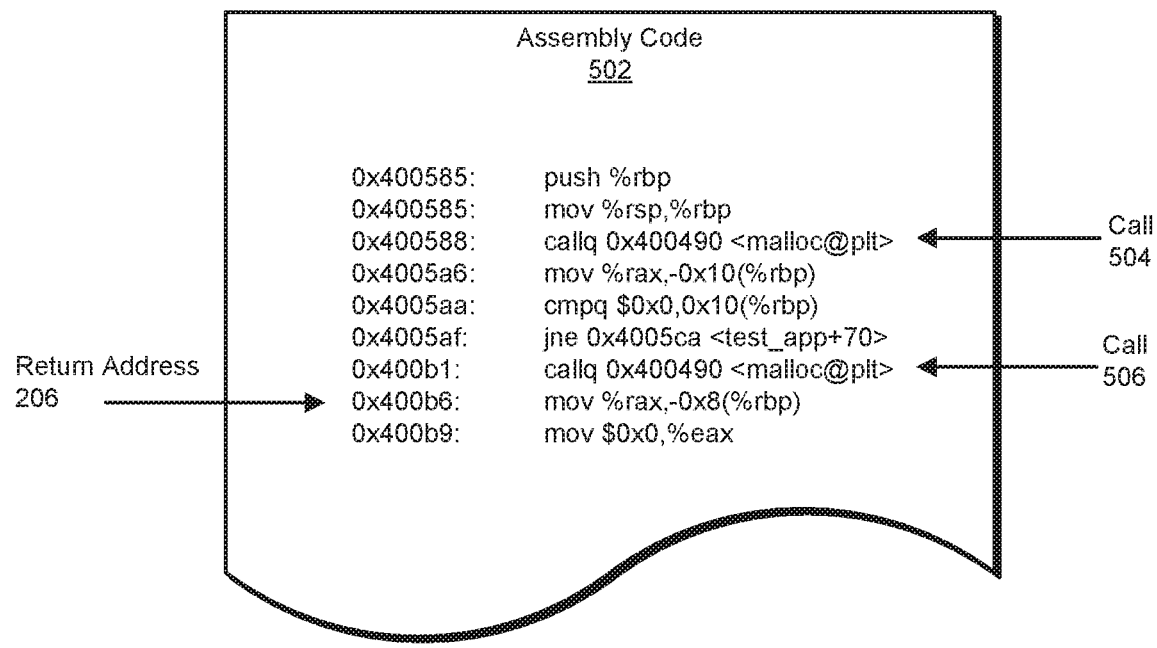
FIG. 5 is an illustration of exemplary assembly code of an application.

FIG. 5 illustrates exemplary assembly code 502. In this example, assembly code 502 may correspond to and/or represent the assembly code of the caller function shown in FIG. 4. As illustrated in FIG. 5, assembly code 502 may contain two calls to the function "malloc" (corresponding to target API 122). Specifically, assembly code 502 may contain a call 504 and a call 506. In one embodiment, extraction module 106 may determine that call 506 (and not call 504) is to be replaced with a call to replacement API 124. For example, extraction module 106 may determine that call 506 is to be replaced based on call 506 being the second call (corresponding to replacement position "2" within FIG. 4) to target API 122 within the caller function. After determining that call 506 represents the call to be replaced, extraction module 106 may identify return address 206 by identifying the memory address of the subroutine that follows call 506. In the example of FIG. 5, return address 206 may correspond to the memory address "0x400b9."

In some embodiments, extraction module 106 may store return address 206 within a table, database, or other type of file that is accessible to API replacement unit 208 during execution of application 120. By doing so, extraction module 106 may enable API replacement unit 208 to quickly (e.g., immediately) detect when a call has been made to an instance of target API 122 that is to be replaced. In one example, extraction module 106 may store return address 206 within a replacement scenario table that associates a name and/or function called by target API 122 with information such as return address 206, the replacement position of the call to be replaced, the particular replacement API to be implemented, and/or the loop iteration to be replaced.

In some examples, extraction module 106 may store such a replacement scenario table in connection with application 120 and/or replacement API 124. In particular, extraction module 106 may store this table in connection with a replacement shared library that stores a definition of replacement API 124. For example, extraction module 106 may store these files in the same or a similar location. Additionally or alternatively, extraction module 106 may include, within at least one file, a reference or pointer to the other file. In this way, API replacement unit 208 may efficiently access both the replacement scenario table and the replacement shared library in response to detecting a call to an API during execution of application 120.

Figure 6:
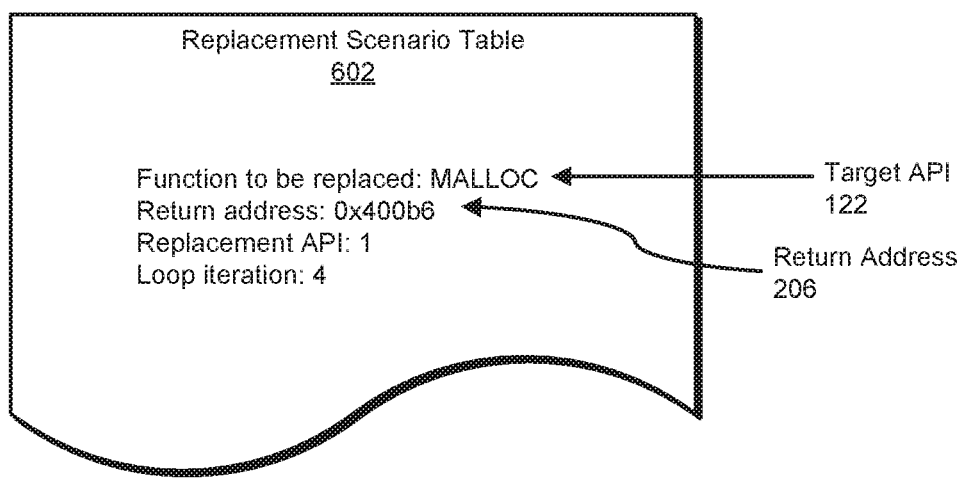
FIG. 6 is an illustration of an exemplary replacement scenario table used to dynamically replace call paths of running applications.

FIG. 6 illustrates an exemplary replacement scenario table 602. In this example, replacement scenario table 602 may describe and/or identify call 506 illustrated in FIG. 5. In one embodiment, extraction module 106 may generate replacement scenario table 602 after extracting return address 206 from assembly code 502. As shown in FIG. 6, replacement scenario table 602 may indicate that a call to the function "malloc" with a return address "0x400b6" is to be replaced. Replacement scenario table 602 may also indicate that this call corresponds to a loop and that only the fourth iteration of "malloc" within the loop is to be replaced. In addition, replacement scenario table 602 may indicate that this particular instance of "malloc" is to be replaced with replacement API "1." Table 602 may contain any additional or alternative information that may enable API replacement unit 208 to appropriately detect and/or replace call 506.

As mentioned above, in some embodiments, a user may indicate that each instance of target API 122 is to be replaced with replacement API 124 (i.e., the user may request a global replacement). In these embodiments, extraction module 106 may indicate, to other components of API replacement unit 208, that target API 122 is to be globally replaced. For example, extraction module 106 may generate a replacement scenario table that identifies the return address of each instance of target API 122 within application 120. Alternatively, extraction module 106 may signal that target API 122 is to be globally replaced by not generating any replacement scenario table associated with target API 122. In other words, because a replacement scenario table may describe one or more particular instances of target API 122, such a table may be unnecessary to facilitate global replacements.

Returning to FIG. 3, at step 330 one or more of the systems described herein may detect, during execution of the application, a call to the target API that pushes the return address of the instance of the target API onto the call stack of the application. For example, detection module 108 may, as part of computing device 202 in FIG. 2, detect, during execution of application 120, a call to target API 122 that pushes return address 206 onto the call stack of application 120.

The systems described herein may perform step 330 in a variety of ways and/or contexts. In some examples, detection module 108 may perform one or more actions before execution of application 120 to facilitate detecting a call to target API 122 that is to be replaced. For example, before application 120 runs, detection module 108 may load a replacement shared library that contains a definition of replacement API 124. Specifically, detection module 108 may load the shared library into a cache or other fast-access memory location within computing device 202. Detection module 108 may also load a shared library that stores a definition of target API 122 and/or any additional or alternative shared library. In addition, detection module 108 may load a replacement scenario table that describes and/or identifies one or more calls to target API 122 that are to be replaced.

After completing all or a portion of these actions, detection module 108 may direct and/or allow computing device 202 to execute application 120. In one embodiment, detection module 108 may direct computing device 202 to execute application 120 within a dedicated execution space that is capable of being monitored and/or designed to be monitored by API replacement unit 208. In other embodiments, detection module 108 may direct computing device 202 to execute application 120 within any suitable execution space of computing device 202.

While application 120 is running, detection module 108 may detect one or more calls to an API. In response to detecting a call to an API, detection module 108 may determine whether the call is to an instance of target API 122 that is to be replaced with a call to replacement API 124. Detection module 108 may make this determination in a variety of ways. In one example, detection module 108 may determine whether a definition of the called API is stored within a replacement shared library generated by generation module 104. Specifically, detection module 108 may search the replacement shared library for a definition corresponding to the name of the called API. In the event that detection module 108 determines that the called API is defined within the replacement shared library, detection module 108 may infer and/or conclude that at least certain calls to the API are to be replaced. For example, detection module 108 may determine that a call to target API 122 should potentially be replaced based on identifying the definition of replacement API 124 within a replacement shared library.

After detecting a call to target API 122, detection module 108 may determine whether the call represents and/or corresponds to a particular call that the user has selected to replace. For example, detection module 108 may compare contextual details about the call to information within a replacement scenario table that identifies particular instances of target API 122 that are to be replaced. Specifically, detection module 108 may compare the current return address of the call stack of application 120 with return address 206 within replacement scenario table 602. Detection module 108 may identify the current return address of the call stack of application 120 in a variety of ways, such as by implementing a "builtin_return_address" API. In the event that the current return address matches return address 206, detection module 108 may determine that the current call to target API 122 should be replaced.

In other examples, detection module 108 may determine that a call to target API 122 should be replaced by determining that the replacement shared library that stores the definition of replacement API 124 does not refer to and/or is not associated with a replacement scenario table that identifies particular instances of target API 122 to be replaced. For example, as mentioned above, API replacement unit 208 may indicate that target API 122 is to be globally replaced by not generating a replacement scenario table associated with target API 122.

In some embodiments, detection module 108 may determine that a call to an API made during execution of application 120 should not be replaced with a call to another API. For example, detection module 108 may determine that a replacement shared library generated by generation module 104 does not contain a definition of the called API. In another example, detection module 108 may determine that the replacement shared library does contain the definition of the called API but a return address of the call does not match a return address identified within a replacement scenario table associated with the called API. For example, detection module 108 may determine that a different instance of the called API is to be replaced.

Returning to FIG. 3, at step 340 one or more of the systems described herein may implement, in response to detecting the call, the replacement API in lieu of the target API. For example, in response to detecting the call, implementation module 110 may, as part of computing device 202 in FIG. 2, implement replacement API 124 in lieu of target API 122.

The systems described herein may perform step 340 in a variety of ways and/or contexts. In some examples, implementation module 110 may implement replacement API 124 in accordance with a scenario described in a replacement scenario table. For example, implementation module 110 may implement a version of replacement API 124 that corresponds to a replacement API number within the replacement scenario table. In another example, implementation module 110 may implement replacement API 124 in lieu of a certain iteration of target API 122 within a loop based on a loop iteration number within the replacement scenario table. Referring to the examples illustrated in FIGS. 4-6, implementation module 110 may extract the replacement API number and the loop iteration number indicated within replacement scenario table 602. Based on this information, implementation module 110 may implement replacement API 124 in lieu of the fourth iteration of target API 122 within a loop that is currently executing.

As mentioned above, in some embodiments, generation module 104 may program and/or configure replacement API 124 to facilitate instrumentation of target API 122. For example, generation module 104 may program replacement API 124 to call target API 122 and then monitor specific behaviors and/or outputs of target API 122 while target API 122 runs. In this example, implementing replacement API 124 may enable a user of application 120 to obtain useful instrumentation data about target API 122 without inserting instrumentation instructions into the source code of application 120. Notably, such instrumentation may be performed either globally or selectively (e.g., by replacing only certain instances of target API 122 with replacement API 124).

After implementation module 110 implements replacement API 124 in lieu of an instance of target API 122, implementation module 110 may facilitate passing control of the execution of application 120 back to the call stack of application 120. For example, after replacement API 124 finishes running, application 120 may call the function indicated at return address 206. As such, after the disclosed systems implement replacement API 124 in lieu of target API 122, execution of application 120 may continue normally (e.g., as programmed) and without delays and/or interruptions.

As mentioned above, in some embodiments, API replacement unit 208 may detect a call to target API 122 that should not be replaced. In such embodiments, implementation module 110 may facilitate implementing target API 122. For example, in response to detection module 108 detecting a call to target API 122 that is not to be replaced, implementation module 110 may access a shared library that is known to store the definition of target API 122. Implementation module 110 may implement this definition and then return control of application 120 to the call stack of application 120.

Figure 7:
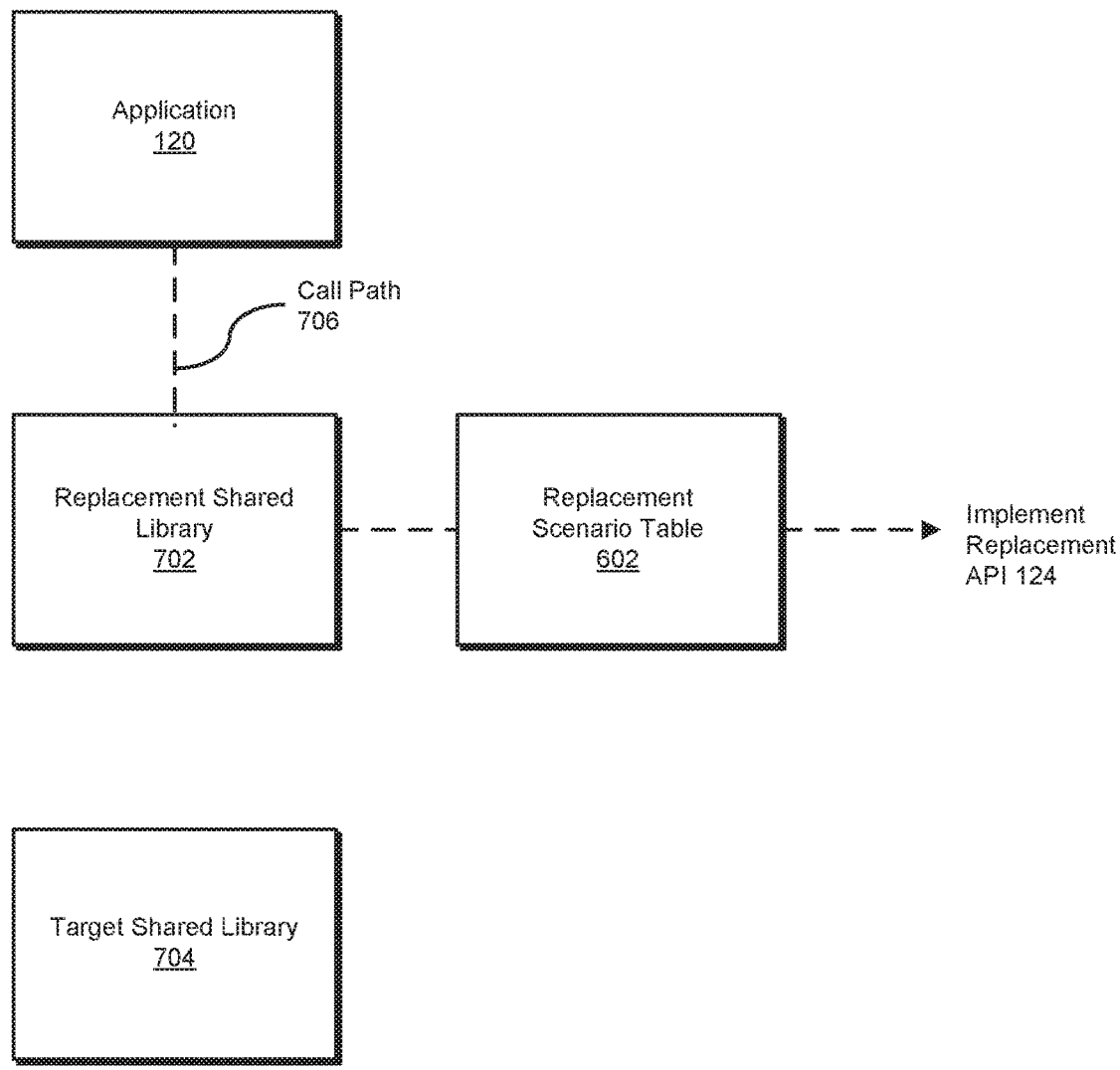
FIG. 7 is a block diagram of an exemplary implementation for dynamically replacing call paths of running applications.

FIG. 7 illustrates an exemplary implementation 700 of the disclosed systems for dynamically replacing call paths of running applications. In particular, implementation 700 illustrates an exemplary call path 706 that API replacement unit 208 may follow in response to call 506 shown in FIG. 5.

In implementation 700, detection module 108 may load replacement scenario table 602 prior to execution of application 120. Detection module 108 may also load a replacement shared library 702 and a target shared library 704. In one embodiment, replacement shared library 702 may store a definition of replacement API 124 and target shared library 704 may store a definition of target API 122. In some examples, detection module 108 detect call 506 while monitoring and/or detecting all or a portion of the calls made to APIs during execution of application 120. In response to detecting call 506, detection module 108 may search replacement shared library 702 for a definition of the called API (i.e., the function "malloc"). Notably, detection module 108 may search replacement shared library 702 before searching target shared library 704. In implementation 700, detection module 108 may determine that replacement shared library 702 stores the definition of the called API. Specifically, detection module 108 may identify the definition of replacement API 124 within shared library 702.

In response to identifying the definition of the called API within replacement shared library 702, detection module 108 may search replacement scenario table 602 to determine whether the current call to target API 122 should be replaced with a call to replacement API 124. For example, detection module 108 may compare the current return address of the call stack of application 120 with return address 206 stored within replacement scenario table 602. In implementation 700, detection module 108 may determine that these return addresses match. As such, implementation module 110 may implement replacement API 124 in accordance with the execution scenario described within replacement scenario table 602. Notably, implementation module 110 may implement replacement API 124 in lieu of target API 122 without altering the source code of application 120 and without delaying and/or interrupting the execution of application 120.

Figure 8:
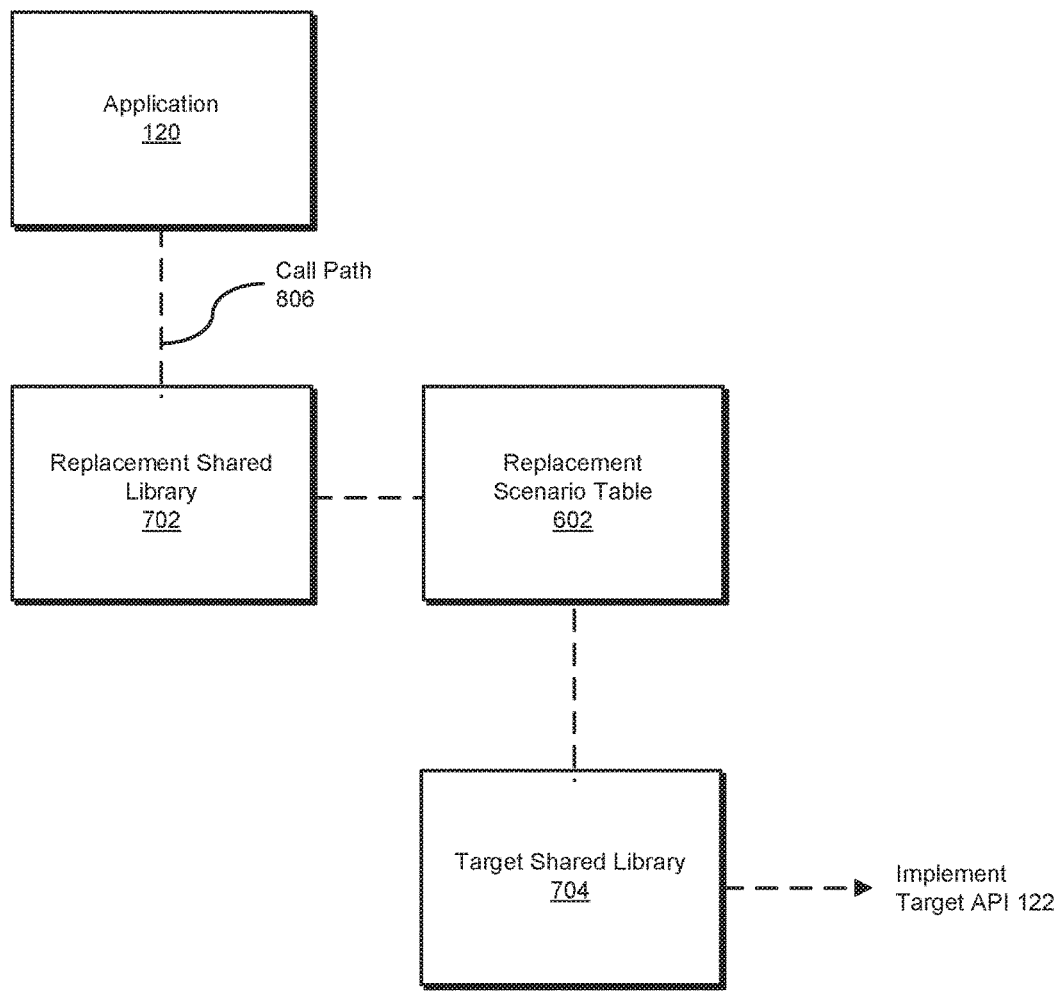
FIG. 8 is a block diagram of an additional exemplary implementation for dynamically replacing call paths of running application.

FIG. 8 illustrates an exemplary implementation 800 of the disclosed systems for dynamically replacing call paths of running applications. In particular, implementation 800 shows an exemplary call path 806 that API replacement unit 208 may follow in response to detecting call 504 shown in FIG. 5.

As in implementation 700, in implementation 800 detection module 108 may load replacement scenario table 602, replacement shared library 702, and/or target shared library 704 prior to execution of application 120. In addition, the beginning of call path 806 may be generally similar to the beginning of call path 706. For example, after detecting call 504, detection module 108 may search replacement shared library 702 for a definition of the called API. In this example, detection module 108 may determine that replacement shared library 702 stores this definition. In response to determining that replacement shared library 702 stores the definition of the called API, detection module 108 may compare the current return address of the call stack of application 120 with return address 206 within replacement scenario table 602. In implementation 800, detection module 108 may determine that the return addresses do not match. Thus, detection module 108 may determine that call 504 should not be replaced with a call to replacement API 124.

At this point, call path 806 may diverge from call path 706. For example, after determining that call 504 should not be replaced with a call to replacement API 124, implementation module 110 may identify the definition of target API 122 within target shared library 704. Implementation module 110 may then implement target API 122 based on this definition and/or in accordance with the execution scenario application 120 is programmed to implement. As explained in connection with implementations 700 and 800, the disclosed systems may dynamically replace certain call paths (e.g., call paths selected by a user) during execution of an application while ensuring that the remaining call paths are not altered, delayed, and/or otherwise affected.

Figure 9:
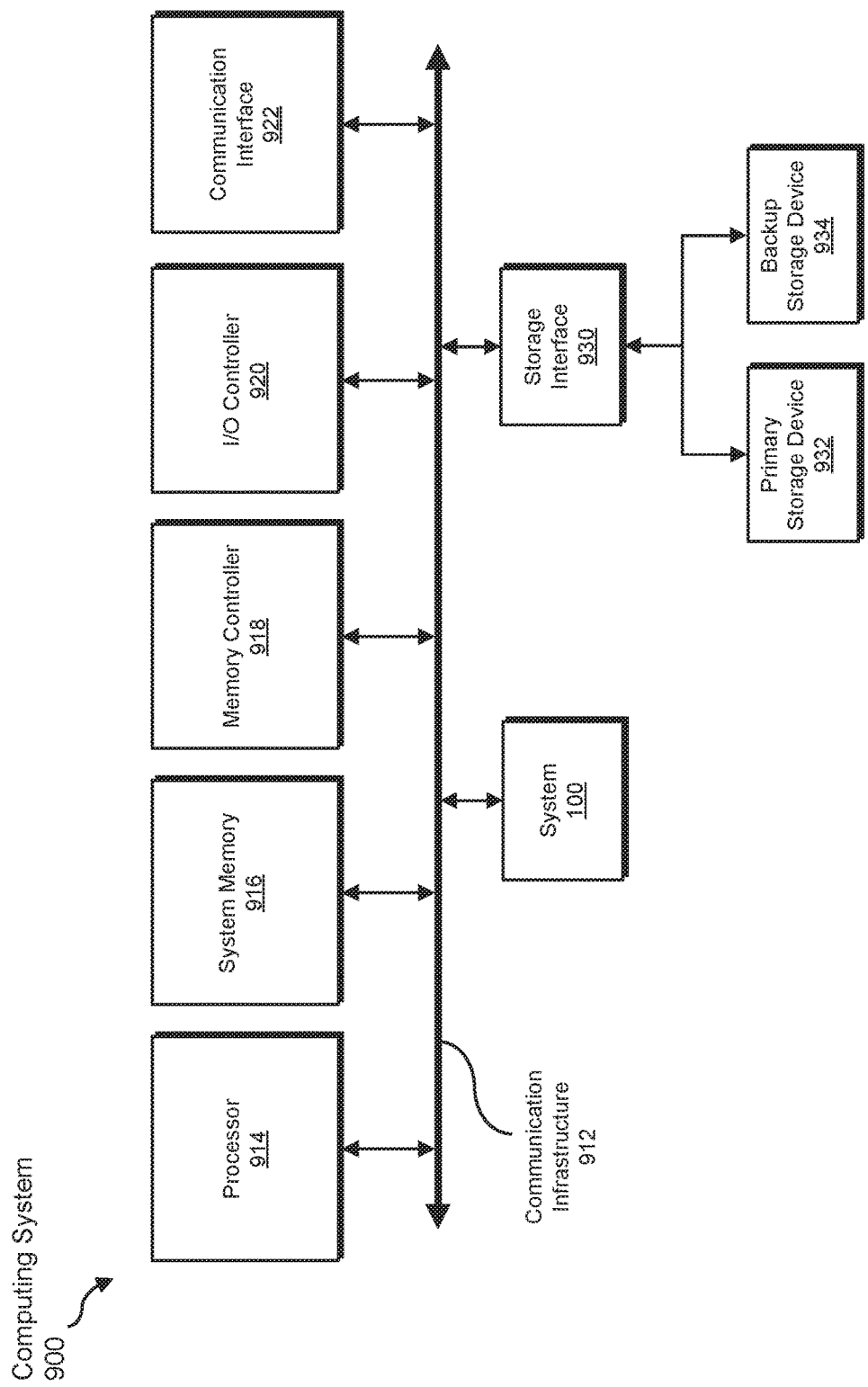
FIG. 9 is a block diagram of an exemplary computing system capable of implementing and/or being used in connection with one or more of the embodiments described and/or illustrated herein.

FIG. 9 is a block diagram of an exemplary computing system 900 capable of implementing and/or being used in connection with one or more of the embodiments described and/or illustrated herein. In some embodiments, all or a portion of computing system 900 may perform and/or be a means for performing, either alone or in combination with other elements, one or more of the steps described in connection with FIG. 3. All or a portion of computing system 900 may also perform and/or be a means for performing and/or implementing any other steps, methods, or processes described and/or illustrated herein. In one example, computing system 900 may include system 100 from FIG. 1.

Computing system 900 broadly represents any type or form of electrical load, including a single or multi-processor computing device or system capable of executing computer-readable instructions. Examples of computing system 900 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 900 may be programmed, configured, and/or otherwise designed to comply with one or more networking protocols. According to certain embodiments, computing system 900 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 900 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 900 may include various network and/or computing components. For example, computing system 900 may include at least one processor 914 and a system memory 916. Processor 914 generally represents any type or form of processing unit capable of processing data or interpreting and executing instructions. For example, processor 914 may represent an application-specific integrated circuit (ASIC), a system on a chip (e.g., a network processor), a hardware accelerator, a general purpose processor, and/or any other suitable processing element.

Processor 914 may process data according to one or more of the networking protocols discussed above. For example, processor 914 may execute or implement a portion of a protocol stack, may process packets, may perform memory operations (e.g., queuing packets for later processing), may execute end-user applications, and/or may perform any other processing tasks.

System memory 916 generally represents any type or form of volatile or non-volatile storage device or medium capable of storing data and/or other computer-readable instructions. Examples of system memory 916 include, without limitation, Random Access Memory (RAM), Read Only Memory (ROM), flash memory, or any other suitable memory device. Although not required, in certain embodiments computing system 900 may include both a volatile memory unit (such as, for example, system memory 916) and a non-volatile storage device (such as, for example, primary storage device 932, as described in detail below). System memory 916 may be implemented as shared memory and/or distributed memory in a network device. Furthermore, system memory 916 may store packets and/or other information used in networking operations.

In certain embodiments, exemplary computing system 900 may also include one or more components or elements in addition to processor 914 and system memory 916. For example, as illustrated in FIG. 9, computing system 900 may include a memory controller 918, an Input/Output (I/O) controller 920, and a communication interface 922, each of which may be interconnected via communication infrastructure 912. Communication infrastructure 912 generally represents any type or form of infrastructure capable of facilitating communication between one or more components of a computing device. Examples of communication infrastructure 912 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 918 generally represents any type or form of device capable of handling memory or data or controlling communication between one or more components of computing system 900. For example, in certain embodiments memory controller 918 may control communication between processor 914, system memory 916, and I/O controller 920 via communication infrastructure 912. In some embodiments, memory controller 918 may include a Direct Memory Access (DMA) unit that may transfer data (e.g., packets) to or from a link adapter.

I/O controller 920 generally represents any type or form of device or module capable of coordinating and/or controlling the input and output functions of a computing device. For example, in certain embodiments I/O controller 920 may control or facilitate transfer of data between one or more elements of computing system 900, such as processor 914, system memory 916, communication interface 922, and storage interface 930.

Communication interface 922 broadly represents any type or form of communication device or adapter capable of facilitating communication between exemplary computing system 900 and one or more additional devices. For example, in certain embodiments communication interface 922 may facilitate communication between computing system 900 and a private or public network including additional computing systems. Examples of communication interface 922 include, without limitation, a link adapter, a wired network interface (such as a network interface card), a wireless network interface (such as a wireless network interface card), and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 922 may also represent a host adapter configured to facilitate communication between computing system 900 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 922 may also enable computing system 900 to engage in distributed or remote computing. For example, communication interface 922 may receive instructions from a remote device or send instructions to a remote device for execution.

As illustrated in FIG. 9, exemplary computing system 900 may also include a primary storage device 932 and/or a backup storage device 934 coupled to communication infrastructure 912 via a storage interface 930. Storage devices 932 and 934 generally represent any type or form of storage device or medium capable of storing data and/or other computer-readable instructions. For example, storage devices 932 and 934 may represent a magnetic disk drive (e.g., a so-called hard drive), a solid state drive, a floppy disk drive, a magnetic tape drive, an optical disk drive, a flash drive, or the like. Storage interface 930 generally represents any type or form of interface or device for transferring data between storage devices 932 and 934 and other components of computing system 900.

In certain embodiments, storage devices 932 and 934 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 934 may also include other similar structures or devices for allowing computer software, data, or other computer-readable instructions to be loaded into computing system 900. For example, storage devices 932 and 934 may be configured to read and write software, data, or other computer-readable information. Storage devices 932 and 934 may be a part of computing system 900 or may be separate devices accessed through other interface systems.

Many other devices or subsystems may be connected to computing system 900. Conversely, all of the components and devices illustrated in FIG. 9 need not be present to practice the embodiments described and/or illustrated herein. The devices and subsystems referenced above may also be interconnected in different ways from those shown in FIG. 9. Computing system 900 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
    generating a replacement application program interface to be implemented during execution of an application in lieu of at least one instance of a target application program interface of the application;
    prior to executing the application, extracting a return address of the instance of the target application program interface from assembly code of a caller function that calls the instance of the target application program interface;
    detecting, during execution of the application, a call to the target application program interface that pushes the return address of the instance of the target application program interface onto a call stack of the application; and
    facilitating evaluation of behaviors exhibited by the application in connection with the replacement application program interface by implementing, in response to detecting the call, the replacement application program interface in lieu of the target application program interface.

2. The method of claim 1, wherein generating the replacement application program interface comprises:
    receiving, from a user of the application, at least one desired function of the replacement application program interface; and
    programming the replacement application program interface such that the replacement application program interface performs the desired function.

3. The method of claim 1, further comprising storing a definition of the replacement application program interface within a replacement shared library that is separate from a target shared library that stores a definition of the target application program interface.

4. The method of claim 3, wherein detecting the call to the target application program interface that pushes the return address of the instance of the target application program interface onto the call stack of the application comprises:
    detecting a call to an application program interface during execution of the application;
    determining, in response to detecting the call to the application program interface, that the replacement shared library stores a definition of the called application program interface; and
    determining that the called application program interface is the target application program interface based at least in part on the replacement shared library storing the definition of the called application program interface.

5. The method of claim 4, wherein determining that the replacement shared library stores the definition of the called application program interface comprises:
    loading the replacement shared library before execution of the application such that the replacement shared library is available during execution of the application; and
    searching the replacement shared library for the definition of the called application program interface before searching the target shared library.

6. The method of claim 5, further comprising:
    generating a table that indicates a position of the instance of the target application program interface relative to at least one additional instance of the target application program interface within computer-executable instructions executed by the application; and
    storing the table in connection with the replacement shared library.

7. The method of claim 6, wherein detecting the call to the target application program interface that pushes the return address of the instance of the target application program interface onto the call stack of the application further comprises determining that a position of the called application program interface within the computer-executable instructions corresponds to the position of the instance of the target application program interface indicated within the table.

8. The method of claim 1, wherein implementing the replacement application program interface in lieu of the target application program interface comprises implementing the replacement application program interface in lieu of a single iteration of the target application program interface within a loop that performs multiple iterations of the target application program interface.

9. The method of claim 1, wherein implementing the replacement application program interface in lieu of the target application program interface comprises implementing the replacement application program interface in lieu of each instance of the target application program interface of the application.

10. The method of claim 1, further comprising:
    detecting an additional call to the target application program interface during execution of the application;
    determining that the additional call does not push the return address of the instance of the target application program interface onto the call stack of the application; and
    implementing the target application program interface in response to determining that the additional call does not push the return address of the instance of the target application program interface onto the call stack of the application.

11. A system comprising:
a generation module, stored in memory, that generates a replacement application program interface to be implemented during execution of an application in lieu of at least one instance of a target application program interface of the application;
an extraction module, stored in memory, that prior to execution of the application, extracts a return address of the instance of the target application program interface from assembly code of a caller function that calls the instance of the target application program interface;
a detection module, stored in memory, that detects, during execution of the application, a call to the target application program interface that pushes the return address of the instance of the target application program interface onto a call stack of the application;
an implementation module, stored in memory, that facilitates evaluating behaviors exhibited by the application in connection with the replacement application program interface by implementing, in response to detecting the call, the replacement application program interface in lieu of the target application program interface; and
at least one physical processor configured to execute the generation module, the extraction module, the detection module, and the implementation module.

12. The system of claim 11, wherein the generation module:
receives, from a user of the application, at least one desired function of the replacement application program interface; and
programs the replacement application program interface such that the replacement application program interface performs the desired function.

13. The system of claim 11, wherein the generation module further stores a definition of the replacement application program interface within a replacement shared library that is separate from a target shared library that stores a definition of the target application program interface.

14. The system of claim 13, wherein the detection module detects the call to the target application program interface that pushes the return address of the instance of the target application program interface onto the call stack of the application by:
detecting a call to an application program interface during execution of the application;
determining, in response to detecting the call to the application program interface, that the replacement shared library stores a definition of the called application program interface; and
determining that the called application program interface is the target application program interface based at least in part on the replacement shared library storing the definition of the called application program interface.

15. The system of claim 14, wherein the detection module determines that the replacement shared library stores the definition of the called application program interface by:

loading the replacement shared library before execution of the application such that the replacement shared library is available during execution of the application; and
searching the replacement shared library for the definition of the called application program interface before searching the target shared library.

16. The system of claim 15, wherein the extraction module further:
generates a table that indicates a position of the instance of the target application program interface relative to at least one additional instance of the target application program interface within computer-executable instructions executed by the application; and
stores the table in connection with the replacement shared library.

17. The system of claim 16, wherein the detection module further detects the call to the target application program interface that pushes the return address of the instance of the target application program interface onto the call stack of the application by determining that a position of the called application program interface within the computer-executable instructions corresponds to the position of the instance of the target application program interface indicated within the table.

18. The system of claim 11, wherein the implementation module implements the replacement application program interface in lieu of a single iteration of the target application program interface within a loop that performs multiple iterations of the target application program interface.

19. The system of claim 11, wherein the implementation module implements the replacement application program interface in lieu of each instance of the target application program interface of the application.

20. An apparatus comprising:
a storage device that stores computer-executable instructions executed by an application; and
a physical processing device communicatively coupled to the storage device, wherein the physical processing device:
generates a replacement application program interface to be implemented during execution of the application in lieu of at least one instance of a target application program interface of the application;
prior to executing the application, extracts a return address of the instance of the target application program interface from assembly code of a caller function that calls the instance of the target application program interface;
detects, during execution of the application, a call to the target application program interface that pushes the return address of the instance of the target application program interface onto a call stack of the application; and
facilitates evaluation of behaviors exhibited by the application in connection with the replacement application program interface by implementing, in response to detecting the call, the replacement application program interface in lieu of the target application program interface.

* * * * *